G. I. MORRISS.
ENAMEL BAKING OVEN.
APPLICATION FILED MAR. 7, 1916.
1,203,237.
Patented Oct. 31, 1916.
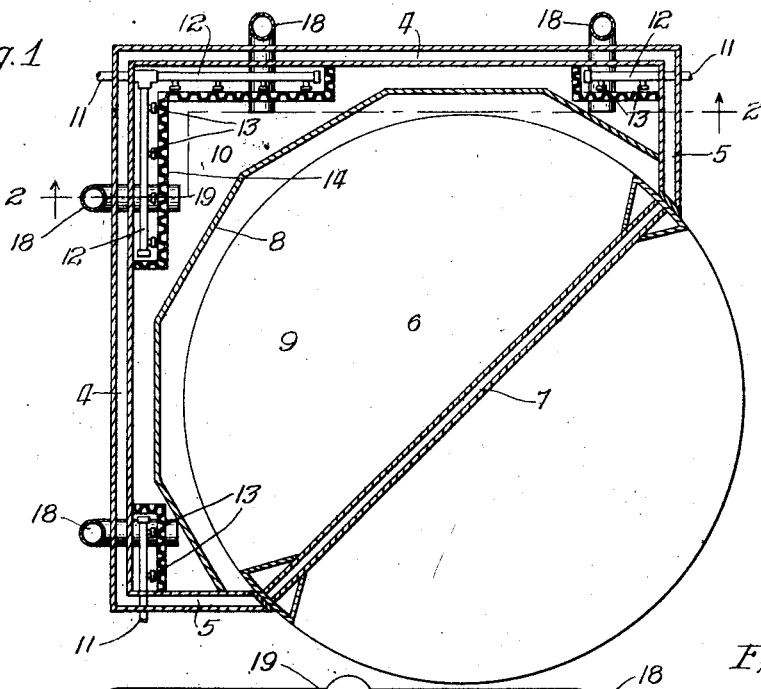
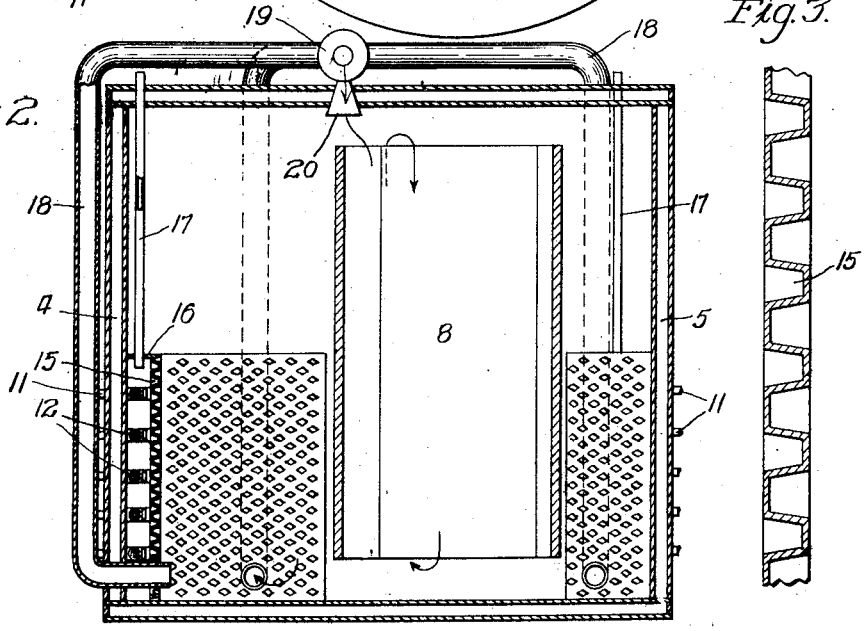
Witness:
Harry S. Gaither
Inventor:
Gray I. Morriss
by Banning & Banning
Attys.

UNITED STATES PATENT OFFICE.

GRAY I. MORRISS, OF CHICAGO, ILLINOIS, ASSIGNOR TO RELIANCE DRYING ROOM CO., OF CHICAGO, ILLINOIS, A CORPORATION OF ILLINOIS.

ENAMEL-BAKING OVEN.

1,203,237.

Specification of Letters Patent. Patented Oct. 31, 1916.

Application filed March 7, 1916. Serial No. 82,550.

*To all whom it may concern:*

Be it known that I, GRAY I. MORRISS, a citizen of the United States, residing at Chicago, county of Cook, and State of Illinois, have invented certain new and useful Improvements in Enamel-Baking Ovens, of which the following is a specification.

This invention relates primarily to a baking oven employing a heater of special form and peculiarly adapted to supply a high degree of heat to the drying or baking chamber without commingling any of the products of combustion with the air intended for drying and baking purposes, and without permitting the ingress of fumes of a possible combustive nature to the space inclosing the flame jets.

The invention further relates to the means provided for increasing the radiating surface available in a somewhat restricted space and to the details of construction and combinations of parts hereinafter described and claimed.

In the drawings: Figure 1 is a plan view of an enamel baking room embodying the heating features of the present invention; Fig. 2 is a sectional view taken on line 2—2 of Fig. 1; and Fig. 3 is an enlarged detail of a section of the radiating wall of the heater.

For purposes of illustration, the heater is shown applied to a baking room having exterior double walls 4—4 set in right angled relation to one another, which walls connect with inward extensions 5—5, which latter terminate in alinement with the periphery of a turn-table 6 having a cross partition 7 so arranged as to be turned into register with the ends of the walls 5 to serve as a door for closing the structure.

The enamel baking room is provided with a polygonal partition wall or screen 8, a portion of which is shown in Fig. 2, and which affords space at the top and bottom for the down circulation of air. This partition divides the structure into a baking chamber 9 and a heating chamber 10.

The foregoing features are described mainly for purposes of illustration, since the heating features of the invention, now to be described, may be utilized in connection with other convenient forms of drying rooms, either with or without the turn-table feature.

The heating chamber, as shown, is relatively narrow in comparison with its length and height, and in order to secure the high degree of temperature necessary for enamel baking purposes, a gas heating appliance is employed which comprises one or more gas supply pipes 11, which latter may, if desired, be provided with branch header pipes 12, as shown in the upper left hand corner of Fig. 1, in which the heater is given angular formation in order to accommodate it to the space afforded in the heating chamber. The gas pipes or the branch pipes, as the case may be, are provided with a series of burner tips or nozzles 13, which are pointed inwardly and positioned to direct the jets of flame directly against a corrugated metal wall 14 which is formed to afford a multiplicity of hollow bumps or protuberances 15 preferably arranged in staggered relation to one another, and designed to afford a very considerable excess of radiating surface as compared with the amount afforded by a plain flat plate. The corrugated heater wall preferably extends from a point at or immediately adjacent the floor of the heating chamber, to a point about midway the height of the chamber. The burner space at the top is inclosed by an inturned wall 16, through which are entered ventilating flues 17 adapted to provide for the escape of the products of combustion to a point outside of the baking structure so as to prevent these products from commingling with fumes given off by the enamel or similar substance which, if permitted, might produce a deleterious effect upon the enamel.

As shown in Fig. 1, the end heaters are of straight rather than angular formation, but it is obvious that the heater can be given a configuration in each case best adapted for use in connection with the wall for which it is intended.

In order to better provide for the circulation of air, a series of updraft flues 18 are provided, which have their lower ends 19 inturned and extended through the burner space and through the heater wall, with the result that the exposed end of each of the updraft flues will be heated to a considerable degree, thereby, in some measure, facilitating the updraft of the air, which may be further increased and accelerated by the employment of a fan 19 above the roof of the baking chamber, and adapted to discharge the air downwardly thereinto. This arrangement of the fan not only serves to facilitate the withdrawal of air from a point near the floor, but also tends to maintain currents of air circulating among and over the partition wall 8 in such a manner as to bring these circulating currents of air into continuous contact with the highly heated surfaces of the gas heaters, so that a very high degree of temperature may be maintained which is essential in the drying and baking of enamel.

In use, where a turn-table is employed, the articles to be dried and baked are stacked up on one side of the turn-table, after which the latter is turned around to reverse position which brings the charge of enamel-ware within the baking chamber, after which the gas jets can be lighted and the baking operation proceeded. By operating the fan, currents of air will be constantly withdrawn from the space beneath the partition and admitted from above, which maintains the constant circulation of air both inside and outside through the baking chamber, and at the same time a very large percentage of the air, passing downwardly through the baking chamber, will be brought into direct contact with the highly heated walls of the heater, and directed upwardly without passing through the updraft flues, thereby maintaining an inner circulation through the heating chamber. Of course, the amount of air withdrawn through the updraft flues may be regulated by increasing or diminishing the speed of the fan, or, if desired, other means may be employed for securing a like result.

The present invention relates primarily to the heating features, and the means for inducing and maintaining a proper circulation of the air currents can be changed or modified, and the form, shape and arrangement of the heating and baking chambers can be modified without departing from the spirit of the invention.

I claim:

1. In a structure of the class described, an outer inclosing wall, a roof, and an inner partition wall dividing the structure into a heating chamber and a baking chamber, a heater in the heating chamber having an inclosed burner space and employing a radiating wall of uneven formation, and a gas nozzle positioned behind the radiating wall and closed off from the heating chamber and in position to discharge a jet of flame against the rear or unexposed face of the radiating wall, substantially as described.

2. In a structure of the class described, an outer inclosing wall, a roof, and an inner partition wall dividing the structure into a heating chamber and a baking chamber, a heater in the heating chamber comprising a radiating wall located in spaced relation with respect to the outer wall of the heating chamber and furnishing in conjunction therewith an inclosed burner space, and a series of gas nozzles located in position to direct jets of flame against the inner surface of the radiating wall for the purpose of heating the same.

3. In a structure of the class described, an outer inclosing wall, a roof, and an inner partition wall dividing the structure into a heating chamber and a baking chamber, a heater in the heating chamber comprising a radiating wall located in spaced relation with respect to the outer wall of the heating chamber and furnishing in conjunction therewith an inclosed burner space, a series of gas nozzles located in position to direct jets of flame against the inner surface of the radiating wall for the purpose of heating the same, and ventilating flues extending upwardly from the burner space and through the heating chamber for discharging the products of combustion, substantially as described.

4. In a structure of the class described, an outer inclosing wall, a roof, and an inner partition wall dividing the structure into a heating chamber and a baking chamber, a heater in the heating chamber comprising a radiating wall located in spaced relation with respect to the outer wall of the heating chamber and furnishing in conjunction therewith an inclosed burner space, a series of gas nozzles located in position to direct jets of flame against the inner surface of the radiating wall for the purpose of heating the same, updraft flues passing through the heater and through the radiating wall near the floor level and extending upwardly outside of said wall and returning to the baking chamber near the top thereof, and means for inducing currents of air through the updraft flues and projecting said currents downwardly into the baking chamber, substantially as described.

5. In a structure of the class described, an outer inclosing wall, a roof, and an inner partition wall dividing the structure into a heating chamber and a baking chamber, a heater in the heating chamber comprising a radiating wall located in spaced relation with respect to the outer wall of the heating chamber and furnishing in conjunction therewith an inclosed burner space, a series of gas nozzles located in position to direct jets of flame against the inner surface of the radiating wall for the purpose of heating the same, ventilating flues extending upwardly from the burner space and through the heating chamber for discharging the products of combustion, updraft flues passing through the heater and through the radiating wall near the floor level, and extending upwardly outside of said wall and returning to the baking chamber near the top thereof, and means for inducing currents of air through the updraft flues and projecting said currents downwardly into the baking chamber, substantially as described.

6. In a structure of the class described, the combination of inclosing walls, a roof, and a partition wall dividing the space within the structure into a heating chamber and baking chamber in communication with one another, and a heater in the heating chamber consisting of a radiating wall in spaced relation with the outer inclosing wall and forming an inclosed burner spaced in conjunction therewith, and gas nozzles positioned to direct jets of flame against the radiating wall, substantially as described.

7. In a structure of the class described, the combination of inclosing walls, a roof, and a partition wall dividing the space within the structure into a heating chamber and baking chamber in communication with one another, and a heater in the heating chamber consisting of a radiating wall of irregular surface contour in spaced relation with the outer inclosing wall and forming an inclosed burner spaced in conjunction therewith, and gas nozzles positioned to direct jets of flame against the radiating wall, substantially as described.

8. In a structure of the class described, the combination of inclosing walls, a roof, and a partition wall dividing the space within the structure into a heating chamber and baking chamber in communication with one another, and a heater in the heating chamber consisting of a radiating wall of irregular surface contour in spaced relation with the outer inclosing wall and forming an inclosed burner spaced in conjunction therewith, and gas nozzles located within the burner space, substantially as described.

GRAY I. MORRISS.

Witnesses:
FRANCES M. FROST,
SAMUEL W. BANNING.